(12) United States Patent
Barsness et al.

(10) Patent No.: US 7,647,484 B2
(45) Date of Patent: Jan. 12, 2010

(54) LOW-IMPACT PERFORMANCE SAMPLING WITHIN A MASSIVELY PARALLEL COMPUTER

(75) Inventors: Eric Lawrence Barsness, Pine Island, MN (US); David L. Darrington, Rochester, MN (US); Amanda E. Peters, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 11/678,208

(22) Filed: Feb. 23, 2007

(65) Prior Publication Data

US 2008/0209179 A1 Aug. 28, 2008

(51) Int. Cl.
*G06F 11/00* (2006.01)
(52) U.S. Cl. ..................................... 712/220
(58) Field of Classification Search .................. 712/220; 718/105; 703/22
See application file for complete search history.

(56) References Cited

U.S. PATENT DOCUMENTS

| 6,996,517 B1* | 2/2006 | Papaefstathiou .............. 703/22 |
| 7,237,140 B2* | 6/2007 | Nakamura et al. ............. 714/4 |
| 7,249,358 B2* | 7/2007 | Emma et al. ................. 718/105 |
| 2002/0156884 A1* | 10/2002 | Bertram et al. ............. 709/224 |
| 2004/0054515 A1* | 3/2004 | Todi et al. ...................... 703/22 |
| 2006/0161648 A1* | 7/2006 | Ding et al. ................... 709/224 |
| 2006/0179296 A1* | 8/2006 | Bartlett et al. ............... 713/152 |

* cited by examiner

*Primary Examiner*—Eric Coleman
(74) *Attorney, Agent, or Firm*—Wood, Herron & Evans, LLP

(57) ABSTRACT

An apparatus, program product and method sample at different times nodes that are performing similar work. Performance data associated with first and second node subsets performing the similar work are sampled at different times, e.g., in a round-robin fashion, and in accordance with a given sampling rate. The performance data is analyzed. Nodes whose performance suffers as a result of a sampling operation may be identified and removed from a subsequent operation.

18 Claims, 4 Drawing Sheets

LOW-IMPACT PERFORMANCE SAMPLING WITHIN A MASSIVELY PARALLEL COMPUTER

FIELD OF THE INVENTION

The invention is generally directed to computers and computer software, and in particular, to the analysis of computer programs.

BACKGROUND OF THE INVENTION

Computer technology has continued to advance at a remarkable pace, with each subsequent generation of a computer system increasing in performance, functionality and storage capacity, and often at a reduced cost. A modern computer system typically comprises one or more central processing units (CPU) and supporting hardware necessary to store, retrieve and transfer information, such as communication buses and memory. A modern computer system also typically includes hardware necessary to communicate with the outside world, such as input/output controllers or storage controllers, and devices attached thereto such as keyboards, monitors, tape drives, disk drives, communication lines coupled to a network, etc.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but doing it much faster, and thereby enabling the use of software having enhanced function. Therefore continuing improvements to computer systems require that these systems be made ever faster.

The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). E.g., if everything runs twice as fast but otherwise works in exactly the same manner, the system will perform a given task in half the time. Enormous improvements in clock speed have been made possible by reduction in component size and integrated circuitry, to the point where an entire processor, and in some cases multiple processors along with auxiliary structures such as cache memories, can be implemented on a single integrated circuit chip. Despite these improvements in speed, the demand for ever faster computer systems has continued, a demand which can not be met solely by further reduction in component size and consequent increases in clock speed. Attention has therefore been directed to other approaches for further improvements in throughput of the computer system.

Without changing the clock speed, it is possible to improve system throughput by using a parallel computer system incorporating multiple processors that operate in parallel with one another. The modest cost of individual processors packaged on integrated circuit chips has made this approach practical. Although the use of multiple processors creates additional complexity by introducing numerous architectural issues involving data coherency, conflicts for scarce resources, and so forth, it does provide the extra processing power needed to increase system throughput, given that individual processors can perform different tasks concurrently with one another.

Various types of multi-processor systems exist, but one such type of system is a massively parallel nodal system for computationally intensive applications. Such a system typically contains a large number of processing nodes, each node having its own processor or processors and local (nodal) memory, where the nodes are arranged in a regular matrix, or lattice structure. The system contains a mechanism for communicating data among different nodes, a control mechanism for controlling the operation of the nodes, and an I/O mechanism for loading data into the nodes from one or more I/O devices and receiving output from the nodes to the I/O device(s). In general, each node acts as an independent computer system in that the addressable memory used by the processor is contained entirely within the processor's local node, and the processor has no capability to directly reference data addresses in other nodes. However, the control mechanism and I/O mechanism are shared by all the nodes.

A massively parallel nodal system such as described above is a general-purpose computer system in the sense that it is capable of executing general-purpose applications, but it is designed for optimum efficiency when executing computationally intensive applications, i.e., applications in which the proportion of computational processing relative to I/O processing is high. In such an application environment, each processing node can independently perform its own computationally intensive processing with minimal interference from the other nodes. In order to support computationally intensive processing applications which are processed by multiple nodes in cooperation, some form of inter-nodal data communication matrix is provided. This data communication matrix supports selective data communication paths in a manner likely to be useful for processing large processing applications in parallel, without providing a direct connection between any two arbitrary nodes. Optimally, I/O workload is relatively small, because the limited I/O resources would otherwise become a bottleneck to performance.

An exemplary massively parallel nodal system is the IBM Blue Gene®/L (BG/L) system. The BG/L system contains many (e.g., in the thousands) processing nodes, each having multiple processors and a common local (nodal) memory, and with five specialized networks interconnecting the nodes for different purposes. The processing nodes are arranged in a logical three-dimensional torus network having point-to-point data communication links between each node and its immediate neighbors in the network. Additionally, each node can be configured to operate either as a single node or multiple virtual nodes (one for each processor within the node), thus providing a fourth dimension of the logical network. A large processing application typically creates one or more blocks of nodes, herein referred to as communicator sets, for performing specific sub-tasks during execution. The application may have an arbitrary number of such communicator sets, which may be created or dissolved at multiple points during application execution. The nodes of a communicator set typically comprise a rectangular parallelopiped of the three-dimensional torus network.

The hardware architecture supported by the BG/L system and other massively parallel computer systems provides a tremendous amount of potential computing power, e.g., petaflop or higher performance. Furthermore, the architectures of such systems are typically scalable for future increases in performance. However, unless the software applications running on the hardware architecture operate efficiently, the overall performance of such systems can suffer.

As an example, BG/L system performance can be hindered by various conditions. Communication bottlenecks between nodes can result from poor network utilization or ported code. Other problems may be attributable to incorrect assumptions about communication nodal matrix geometries. For instance, a designated path between nodes may be longer than it should be, resulting in a load imbalance or link contention. Poor performance may likewise result from cache misses and/or temperature-related problems.

It is consequently incumbent upon system designers and administrators to locate and fix such problems. When assessing performance in massively parallel computers, administrators conventionally gather and evaluate performance data in one of two ways. Using the first technique, administrators simultaneously run one or more performance tools on all of the nodes of the system. The performance data is aggregated and later evaluated. Although this conventional technique provides comprehensive results, the simultaneous burden from analysis on all of the nodes can result in a tremendous overhead on the entire system.

Administrators analyzing performance data using the second technique will conventionally run a performance tool(s) on a single node. Information gleaned from the tool is used to infer performance with regard to the remaining nodes of the lattice. This technique, however, disproportionally burdens the sample node. The resultant overhead on the node can result in slowed system performance, particularly where the monitored node is disproportionately burdened and impacts the overall amount of work that can be done.

To counteract the overhead generated by these conventional techniques, analysts often compromise performance assessments by reducing the sampling rate. A conventional sampling tool may periodically initiate ("wake up"), e.g., every one-five milliseconds, and determine what instruction the processor each node is executing. The handling of the initiating and recording of the sample data may result in overhead that can detrimentally affect system performance. As a consequence, performance analysts reduce the sample rate to lessen the impact on the system being tested. This compromise, however, causes the analyst to have to wait longer to get their results. Since performance analysis is often an iterative process, any additional waiting for each collection can result in significant dissatisfaction for the analyst and a larger bill for a client.

Therefore, a need exists for an improved manner of assessing performance of a plurality of interconnected nodes of a parallel computer system.

SUMMARY OF THE INVENTION

The invention addresses these and other problems associated with the prior art in providing an apparatus, program product and method that sample performance data of a plurality of interconnected nodes comprising a massively parallel computer system by identifying a plurality of nodes doing similar work, and sampling at different times performance data associated with first and second subsets of the plurality of nodes. Typical subsets may include one or more nodes. Embodiments of the invention further analyze the performance data.

Consistent with an aspect of the invention, the identified nodes may be executing a common application, e.g., a mathematical calculation in parallel. The identification of nodes performing similar work may be accomplished automatically and/or manually. Where desired, the subsets may be sampled at a common sampling rate. The sampling rate may be adjusted at any time.

Consistent with another aspect of the invention, an embodiment may determine that the first subset of nodes is performing unsatisfactorily. As such, the first subset may be removed from a subsequent sampling operation.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter may sample nodes performing similar work in a round-robin fashion to achieve efficient performance sampling with relatively little overhead. For instance, performance data associated with nodes doing similar work may be sampled sequentially, or otherwise at different points of time during a sampling operation. In this manner, embodiments may distribute the overhead of performance tooling evenly across homogenous nodes.

In such a multi-node system, the burden placed on the system by a performance tool and its associated overhead may be shared among the nodes. Since work in one embodiment may be distributed evenly amongst the nodes, a round-robin sampling technique may be used such that an analyst is presented with a representative system profile that causes only a fraction of the overhead on each node. For example, if a computing system has two thousand forty-eight nodes (where half of the nodes are running the same application in parallel), overhead may be reduced by three orders of magnitude.

Some embodiments consistent with the invention compare nodes in order to identify which nodes are doing the same type of work. These embodiments may determine the type of work being accomplished by nodes so as to group them into a plurality of nodes for purposes of sampling. This may be accomplished manually or automatically, or both. For instance, results of a node identification may be presented to an administrator for their confirmation. In cases where a plurality of nodes are assigned to a common pool, automatic analysis may not need to be accomplished. The tool may, in that case, just sample across the nodes in the common pool.

If it is determined that a performance tool is having a substantially negative effect on one or more identifiable nodes, embodiments consistent with the invention may eliminate those nodes from the sampling operation. Such negative effects may be attributable to extra cache misses, timing and other conventional problems associated with performance sampling tools.

Further details regarding the aforementioned applications will be described in greater detail below. Other modifications and enhancements to the embodiments described herein will also be apparent to one of ordinary skill in the art having the benefit of the instant disclosure.

Figure 1:
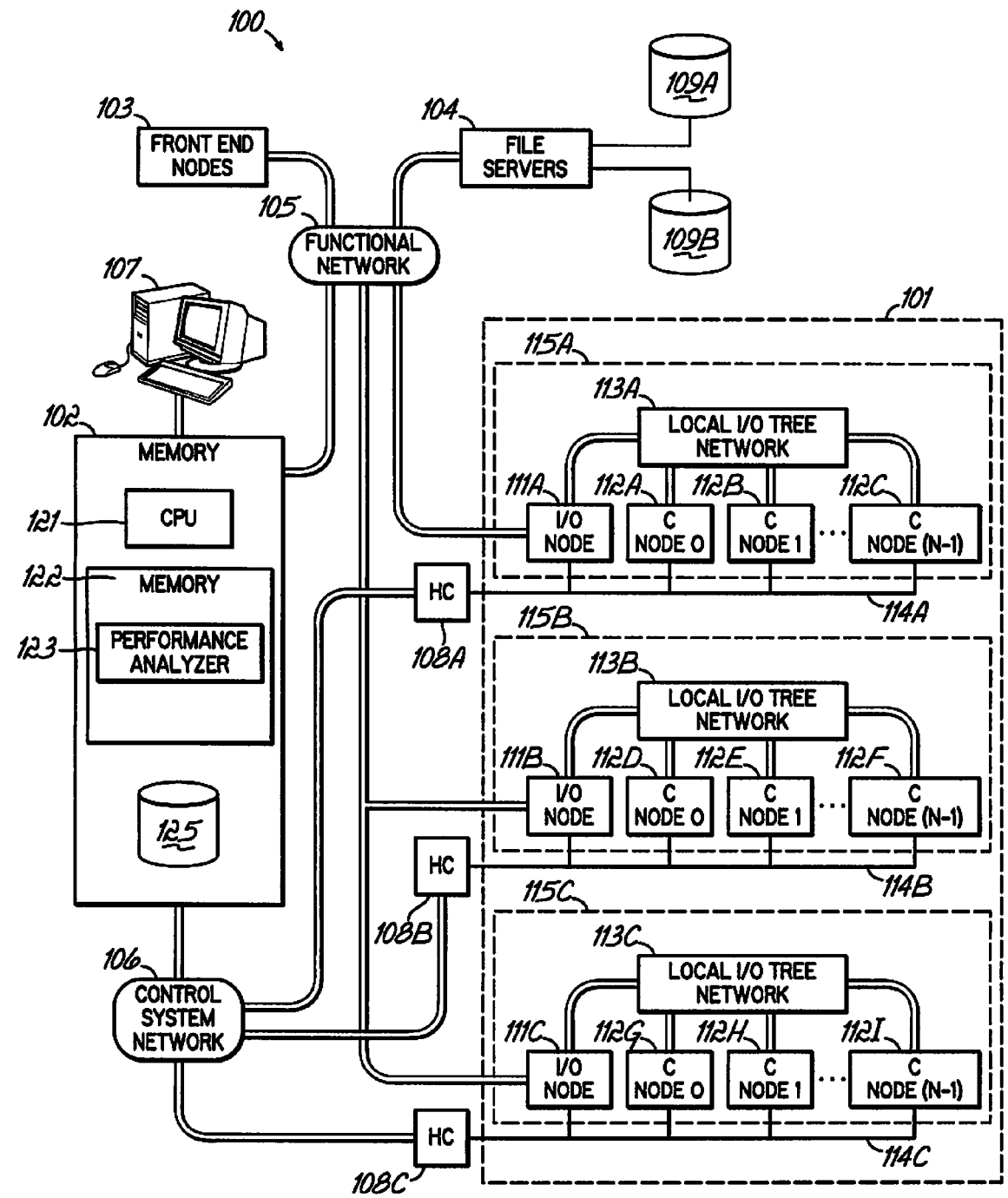
FIG. 1 is a high level block diagram of a massively parallel computer system incorporating functional implementation selection consistent with the invention.

Turning now to the Drawings, wherein like numbers denote like parts throughout the several views, FIG. 1 is a high-level block diagram of the major hardware components of an illustrative embodiment of a massively parallel computer system 100 consistent with the invention. In the illustrated embodiment, computer system 100 is an IBM Blue Gene®/L (BG/L) computer system, it being understood that other computer systems could be used, and the description of an illustrated embodiment herein is not intended to limit the present invention to the particular architecture described.

Computer system 100 includes a compute core 101 having a large number of compute nodes arranged in a regular array or matrix, which collectively perform the bulk of the useful work performed by system 100. The operation of computer system 100 including compute core 101 is generally controlled by control subsystem 102. Various additional processors included in front-end nodes 103 perform certain auxiliary data processing functions, and file servers 104 provide an interface to data storage devices such as rotating magnetic disk drives 109A, 109B or other I/O (not shown). Functional network 105 provides the primary data communications path among the compute core 101 and other system components. For example, data stored in storage devices attached to file servers 104 is loaded and stored to other system components through functional network 105.

Compute core 101 includes I/O nodes 111A-C (herein generically referred to as feature 111) and compute nodes 112A-I (herein generically referred to as feature 112). Compute nodes 112 are the workhorse of the massively parallel system 100, and are intended for executing compute-intensive applications which may require a large number of processes proceeding in parallel. I/O nodes 111 handle I/O operations on behalf of the compute nodes.

Each I/O node includes an I/O processor and I/O interface hardware for handling I/O operations for a respective set of N compute nodes 112, the I/O node and its respective set of N compute nodes being referred to as a Pset. Compute core 101 includes M Psets 115A-C (herein generically referred to as feature 115), each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by the compute core for executing user application processes, as well as data output produced by the compute core as a result of executing user application processes, is communicated externally of the compute core over functional network 105. The compute nodes within a Pset 115 communicate with the corresponding I/O node over a corresponding local I/O tree network 113A-C (herein generically referred to as feature 113). The I/O nodes in turn are attached to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. Control subsystem 102 may be implemented, for example, as mini-computer system including its own processor or processors 121 (of which one is shown in FIG. 1), internal memory 122, and local storage 125, and having an attached console 107 for interfacing with a system administrator. Control subsystem 102 includes an internal database which maintains certain state information for the compute nodes in core 101, and a control application executing on the control subsystem's processor(s) which controls the allocation of hardware in compute core 101, directs the pre-loading of data to the compute nodes, and performs certain diagnostic and maintenance functions.

Control subsystem 102 desirably includes an analytical program 123 for performing more detailed analysis of node/system performance. For instance, program 123 may include program code for initiating the round-robin, or sequential, sampling of first and second subsets of nodes. The subsets may include a single or a group of nodes, and the subsets may be performing similar types of work.

Control subsystem 102 communicates control and state information with the nodes of compute core 101 over control system network 106. Network 106 is coupled to a set of hardware controllers 108A-C (herein generically referred to as feature 108). Each hardware controller communicates with the nodes of a respective Pset 115 over a corresponding local hardware control network 114A-C (herein generically referred to as feature 114). The hardware controllers 108 and local hardware control networks 114 may be considered logically as extensions of control system network 106, although they are physically separate. The control system network and local hardware control network typically operate at a lower data rate than the functional network 105.

In addition to control subsystem 102, front-end nodes 103 each include a collection of processors and memory that perform certain auxiliary functions which, for reasons of efficiency or otherwise, are best performed outside the compute core. Functions that involve substantial I/O operations are generally performed in the front-end nodes. For example, interactive data input, application code editing, or other user interface functions are generally handled by front-end nodes 103, as is application code compilation. Front-end nodes 103 are coupled to functional network 105 for communication with file servers 104, and may include or be coupled to interactive workstations (not shown).

Figure 2:
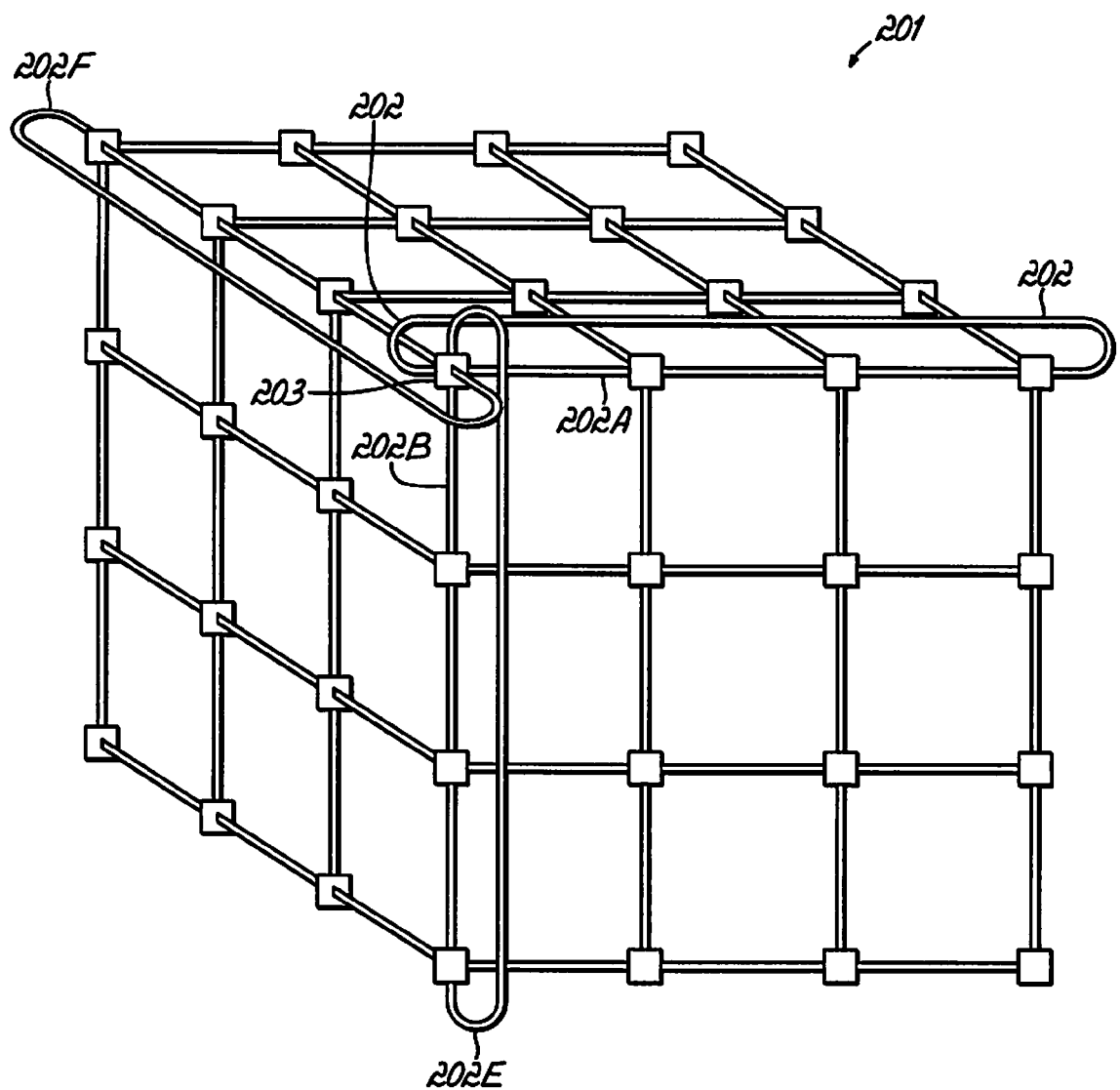
FIG. 2 is a simplified representation of a three dimensional lattice structure and inter-nodal communication network in the massively parallel computer system of FIG. 1.

Compute nodes 112 are logically arranged in a three-dimensional lattice, each compute node having a respective x, y and z coordinate. FIG. 2 is a simplified representation of the three dimensional lattice (also referred to as a mesh or torus) structure 201. Referring to FIG. 2, a simplified 4×4×4 lattice is shown, in which the interior nodes of the lattice are omitted for clarity of illustration. Although a 4×4×4 lattice (having 64 nodes) is represented in the simplified illustration of FIG. 2, it will be understood that the actual number of compute nodes in the lattice is typically much larger. Each compute node in lattice 201 includes a set of six node-to-node communication links 202A-F (herein referred to generically as feature 202) for communicating data with its six immediate neighbors in the x, y and z coordinate dimensions.

As used herein, the term "lattice" includes any regular pattern of nodes and inter-nodal data communications paths in more than one dimension, such that each node has a respective defined set of neighbors, and such that, for any given node, it is possible to algorithmically determine the set of neighbors of the given node from the known lattice structure and the location of the given node in the lattice. A "neighbor" of a given node is any node which is linked to the given node by a direct inter-nodal data communications path, i.e. a path which does not have to traverse another node. A "lattice" may be three-dimensional, as shown in FIG. 2, or may have more or fewer dimensions. The lattice structure is a logical one, based on inter-nodal communications paths. Obviously, in the physical world, it is impossible to create physical structures having more than three dimensions, but inter-nodal communications paths can be created in an arbitrary number of dimensions. It is not necessarily true that a given node's neighbors are physically the closest nodes to the given node, although it is generally desirable to arrange the nodes in such a manner, insofar as possible, as to provide physical proximity of neighbors.

In the illustrated embodiment, the node lattice logically wraps to form a torus in all three coordinate directions, and thus has no boundary nodes. E.g., if the node lattice contains dimx nodes in the x-coordinate dimension ranging from 0 to (dimx−1), then the neighbors of Node ((dimx−1), y0, z0) include Node ((dimx−2), y0, z0) and Node (0, y0, z0), and similarly for the y-coordinate and z-coordinate dimensions. This is represented in FIG. 2 by links 202D, 202E, 202F which wrap around from a last node in an x, y and z dimension, respectively to a first, so that node 203, although it appears to be at a "corner" of the lattice, has six node-to-node links 202A-F. It will be understood that, although this arrangement is an illustrated embodiment, a logical torus without boundary nodes is not necessarily a requirement of a lattice structure.

A subset of the plurality of nodes comprising the lattice in terms of FIG. 2 may comprise one or more of the nodes of the lattice. The nodes of a given plurality of nodes to be sampled in accordance with the principles of the present invention may comprise all or a portion of the nodes of a lattice. As discussed herein, such sampled nodes will typically be doing similar work. For instance, a plurality of nodes to be sampled may be executing the same application/program, or may otherwise be experiencing similar workloads or performance conditions.

The aggregation of node-to-node communication links 202 is referred to herein as the torus network. The torus network permits each compute node to communicate results of data processing tasks to neighboring nodes for further processing in certain applications which successively process data in different nodes. However, it will be observed that the torus network includes only a limited number of links, and data flow is optimally supported when running generally parallel to the x, y or z coordinate dimensions, and when running to successive neighboring nodes. For this reason, applications requiring the use of a large number of nodes may subdivide computation tasks into blocks of logically adjacent nodes (communicator sets) in a manner to support a logical data flow, where the nodes within any block may execute a common application code function or sequence.

Figure 3:
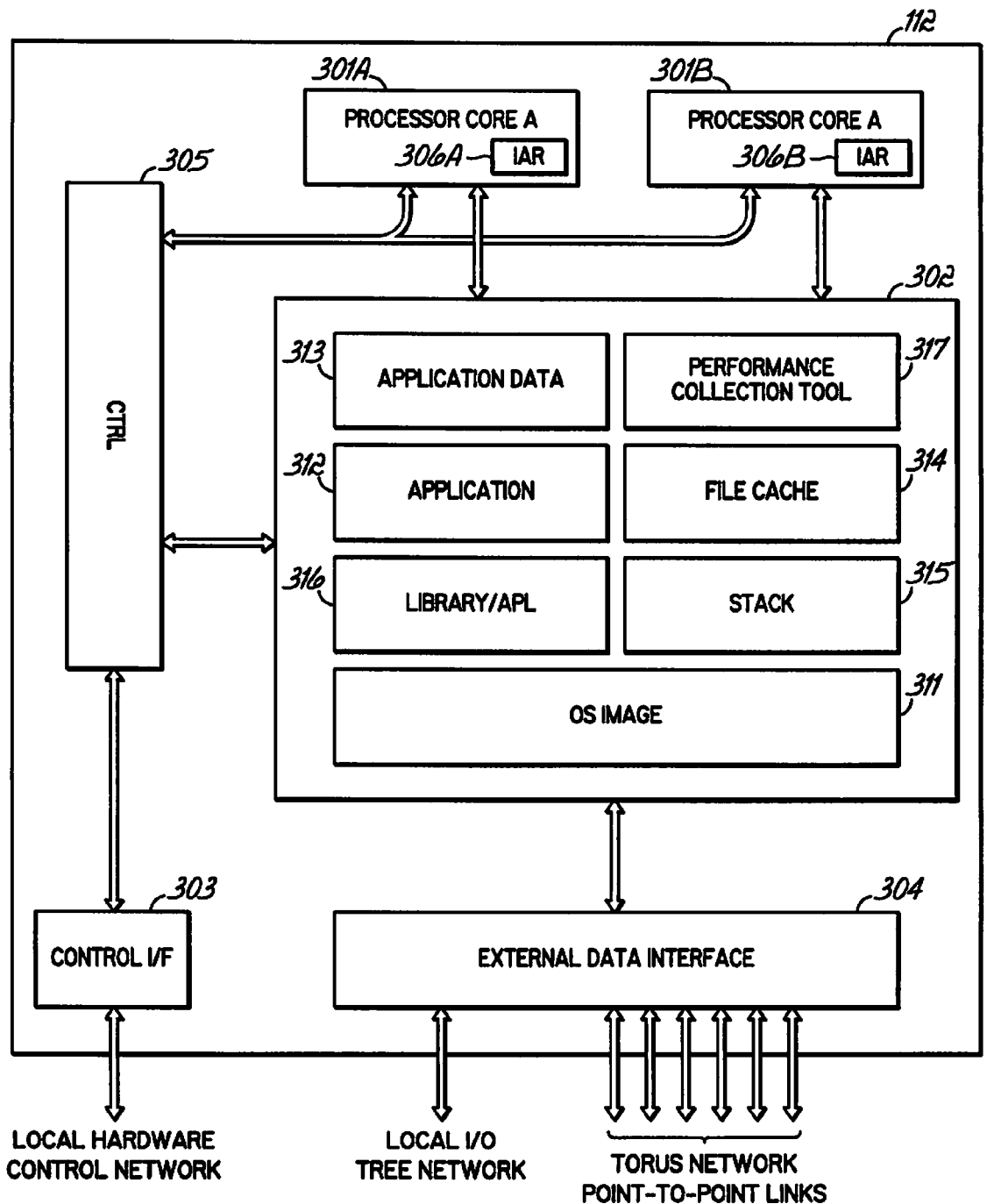
FIG. 3 is a high-level diagram of a compute node in the massively parallel computer system of FIG. 1.

FIG. 3 is a high-level block diagram of the major hardware and software components of a compute node 112 of computer system 100 configured in a coprocessor operating mode. It will be appreciated by one of ordinary skill in the art having the benefit of the instant disclosure that each compute node 112 may also be configurable to operate in a different mode, e.g., within a virtual node operating mode.

Compute node 112 includes one or more processor cores 301A, 301B (herein generically referred to as feature 301), two processor cores being present in the illustrated embodiment, it being understood that this number could vary. Compute node 112 further includes a single addressable nodal memory 302 that is used by both processor cores 301; an external control interface 303 that is coupled to the corresponding local hardware control network 114; an external data communications interface 304 that is coupled to the corresponding local I/O tree network 113, and the corresponding six node-to-node links 202 of the torus network; and monitoring and control logic 305 that receives and responds to control commands received through external control interface 303. Monitoring and control logic 305 can access certain registers in processor cores 301 and locations in nodal memory 302 on behalf of control subsystem 102 to read or alter the state of node 112. In the illustrated embodiment, each node 112 is physically implemented as a respective single, discrete integrated circuit chip.

From a hardware standpoint, each processor core 301 is an independent processing entity capable of maintaining state for and executing threads independently. Specifically, each processor core 301 includes its own instruction state register or instruction address register 306A, 306B (herein generically referred to as feature 306) which records a current instruction being executed, instruction sequencing logic, instruction decode logic, arithmetic logic unit or units, data registers, and various other components required for maintaining thread state and executing a thread.

Each compute node can operate in either coprocessor mode or virtual node mode, independently of the operating modes of the other compute nodes. When operating in coprocessor mode, the processor cores of a compute node do not execute independent threads. Processor Core A 301A acts as a primary processor for executing the user application sub-process assigned to its node, and instruction address register 306A will reflect the instruction state of that sub-process, while Processor Core B 301B acts as a secondary processor which handles certain operations (particularly communications related operations) on behalf of the primary processor. When operating in virtual node mode, each processor core executes its own user application sub-process independently and these instruction states are reflected in the two separate instruction address registers 306A, 306B, although these sub-processes may be, and usually are, separate sub-processes of a common user application. Because each node effectively functions as two virtual nodes, the two processor cores of the virtual node constitute a fourth dimension of the logical three-dimensional lattice 201. Put another way, to specify a particular virtual node (a particular processor core and its associated subdivision of local memory), it is necessary to specify an x, y and z coordinate of the node (three dimensions), plus a virtual node (either A or B) within the node (the fourth dimension).

As described, functional network 105 services many I/O nodes, and each I/O node is shared by multiple compute nodes. It should be apparent that the I/O resources of massively parallel system 100 are relatively sparse in comparison with its computing resources. Although it is a general purpose computing machine, it is designed for maximum efficiency in applications which are compute intensive. If system 100 executes many applications requiring large numbers of I/O operations, the I/O resources will become a bottleneck to performance.

In order to minimize I/O operations and inter-nodal communications, the compute nodes are designed to operate with relatively little paging activity from storage. To accomplish this, each compute node includes its own complete copy of an operating system (operating system image) in nodal memory 302, and a copy of the application code being executed by the processor core. Unlike a conventional multi-tasking system, only one software user application sub-process is active at any given time. As a result, there is no need for a relatively large virtual memory space (or multiple virtual memory spaces) which is translated to the much smaller physical or real memory of the system's hardware. The physical size of nodal memory therefore limits the address space of the processor core.

As shown in FIG. 3, when executing in coprocessor mode, the entire nodal memory 302 is available to the single software application being executed. The nodal memory contains an operating system image 311, an application code image 312, and user application data structures 313 as required. Some portion of nodal memory 302 may further be allocated as a file cache 314, i.e., a cache of data read from or to be written to an I/O file.

Operating system image 311 contains a complete copy of a simplified-function operating system. Operating system image 311 includes certain state data for maintaining process state. Operating system image 311 is desirably reduced to the minimal number of functions required to support operation of the compute node. Operating system image 311 does not need, and desirably does not include, certain of the functions normally included in a multi-tasking operating system for a general purpose computer system. For example, a typical multi-tasking operating system may include functions to support multi-tasking, different I/O devices, error diagnostics and recovery, etc. Multi-tasking support is typically unnecessary because a compute node supports only a single task at a given time; many I/O functions are not required because they are handled by the I/O nodes 111; many error diagnostic and recovery functions are not required because that is handled by control subsystem 102 or front-end nodes 103, and so forth. In the illustrated embodiment, operating system image 311 includes a simplified version of the Linux operating system, it being understood that other operating systems may be used, and further understood that it is not necessary that all nodes employ the same operating system.

Application code image 312 is desirably a copy of the application code being executed by compute node 112. Application code image 312 may include a complete copy of a computer program that is being executed by system 100, but where the program is very large and complex, it may be subdivided into portions that are executed by different respective compute nodes. Memory 302 further includes a call-return stack 315 for storing the states of procedures that must be returned to, which is shown separate from application code image 312, although it may be considered part of application code state data.

In addition, memory 302 typically includes one or more libraries, or Application Programming Interfaces (API's), such as library 316. Each library 316 provides a set of functions made available to application 312, and in some embodiments, each library 316 may be included within operating system image 311. Node performance data may be monitored, typically in part (e.g., in conjunction with system program 123), by a performance collection tool 317 resident in memory 302.

It will be appreciated that when executing in a virtual node mode (not shown), nodal memory 302 is subdivided into a respective separate, discrete memory subdivision, each including its own operating system image, application code image, application data structures, and call-return stacks required to support the user application sub-process being executed by the associated processor core. Since each node executes independently, and in virtual node mode, each processor core has its own nodal memory subdivision maintaining an independent state, and the application code images within the same node may be different from one another, not only in state data but in the executable code contained therein. Typically, in a massively parallel system, blocks of compute nodes are assigned to work on different user applications or different portions of a user application, and within a block all the compute nodes might be executing sub-processes which use a common application code instruction sequence. However, it is possible for every compute node 111 in system 100 to be executing the same or substantially similar instruction sequence, or for every compute node to be executing a different respective sequence using a different respective application code image.

In either coprocessor or virtual node operating mode, the entire addressable memory of each processor core 301 is typically included in the local nodal memory 302. Unlike certain computer architectures such as so-called non-uniform memory access (NUMA) systems, there is no global address space among the different compute nodes, and no capability of a processor in one node to address a location in another node. When operating in coprocessor mode, the entire nodal memory 302 is accessible by each processor core 301 in the compute node. When operating in virtual node mode, a single compute node acts as two "virtual" nodes. This means that a processor core 301 may only access memory locations in its own discrete memory subdivision.

While a system having certain types of nodes and certain inter-nodal communications structures is shown in FIGS. 1 and 2, and a typical node having two processor cores and various other structures is shown in FIG. 3, it should be understood that FIGS. 1-3 are intended only as a simplified example of one possible configuration of a massively parallel system for illustrative purposes, that the number and types of possible devices in such a configuration may vary, and that the system often includes additional devices not shown. In particular, the number of dimensions in a logical matrix, or lattice, might vary; and a system might be designed having only a single processor for each node, with a number of processors greater than two, and/or without any capability to switch between a coprocessor mode and a virtual node mode. While various system components have been described and shown at a high level, it should be understood that a typical computer system includes many other components not shown, which are not essential to an understanding of the present invention. Furthermore, various software entities are represented conceptually in FIGS. 1 and 3 as blocks or blocks within blocks of local memories 122 or 302. However, it will be understood that this representation is for illustrative purposes only, and that particular modules or data entities could be separate entities, or part of a common module or package of modules, and need not occupy contiguous addresses in local memory. Furthermore, although a certain number and type of software entities are shown in the conceptual representations of FIGS. 1 and 3, it will be understood that the actual number of such entities may vary and in particular, that in a complex computer system environment, the number and complexity of such entities is typically much larger.

It will also be appreciated that, while the illustrated embodiment utilizes a massively parallel computer system, the principles of the invention may be applied to other types of parallel, or multi-processor computer systems, whether implemented as multi-user or single-user computers, or in various other programmable electronic devices such as hand-held computers, set top boxes, mobile phones, etc.

The discussion hereinafter will focus on the specific routines utilized to implement the aforementioned functionality. The routines executed to implement the embodiments of the invention, whether implemented as part of an operating system or a specific application, component, program, object, module or sequence of instructions, will also be referred to herein as "implementations," "algorithms," "rules," "computer program code," or simply "program code." The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Furthermore, it will be appreciated that the routines described herein may also be utilized in the deployment of services. In particular, program code that has been generated by the herein described techniques may be deployed to a parallel computer system, e.g., a massively parallel computer system, along with the various implementations of the function for which the program code has been generated. Such deployment may include manual or automated transmission of the program code to an operational computer system, and/or the manual or automated installation of such program code in an operational computer system.

Those skilled in the art will recognize that the exemplary environment illustrated in FIGS. 1-3 is not intended to limit the present invention. Indeed, those skilled in the art will recognize that other alternative hardware and/or software environments may be used without departing from the scope of the invention.

Figure 4:
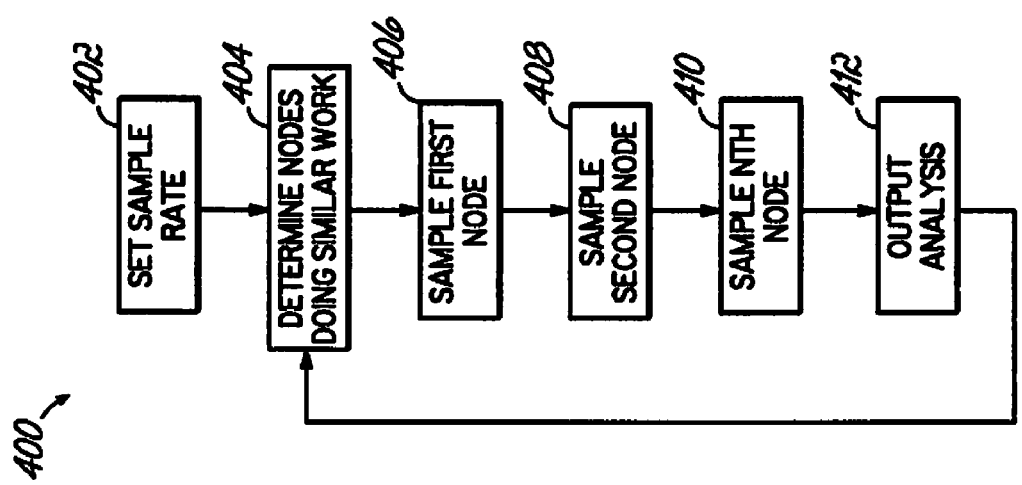
FIG. 4 is a flowchart having steps suitable for execution by the system of FIG. 1 for sampling and analyzing the performance of a plurality of interconnected nodes.

FIG. 4 is a flowchart 400 having steps suitable for execution by the system 100 of FIG. 1 for sampling and analyzing the performance of a plurality of interconnected nodes. The steps of the flowchart 400 generally show a process for sampling at different times the performance data for respective subsets of nodes that are accomplishing similar work. A subset for purposes of the described embodiment typically includes a single node, but may include more.

At block 402 of FIG. 4, an administrator may set a sampling rate at which the nodes at which one or more of the subsets may be sampled. For instance, the administrator may set the sampling rate to have a granularity of one millisecond. Of note, wherein this sampling rate would conventionally sample each node of a plurality of nodes every millisecond, embodiments of the invention may only burden one node at a time and at the given rate. Nonetheless, the desired granularity, i.e., sampling rate, may be preserved. Continuing with the above example, just one of the nodes of the plurality may be sampled every millisecond. In this way, the granularity is preserved, however, the burden on each, individual node may be reduced by one over the total number of nodes in the plurality. Additionally, while the embodiment of FIG. 4 may sample different node subsets at the same sampling rate, other embodiments may sample nodes within a plurality of nodes at different rates.

Those nodes of the lattice doing similar work may be identified at block 404. For instance, a plurality of nodes to be sampled may be executing the same application, or may otherwise be experiencing similar work loads or other performance conditions. In one example, a plurality of nodes may concurrently be calculating a mathematical average.

The system 100 may sample at block 406 a first node of the plurality of nodes identified at block 404 as executing similar work. The node subset sampled at block 406 may be the only node subset sampled at a given instant, prior to a second node subset being sampled at a subsequent time, typically at the same rate. As such, the other nodes of the plurality of nodes executing similar work may perform relatively unimpeded by the sampling tool.

At block 408 of FIG. 4, the system 100 may sample the performance data of a second node subset of the plurality of nodes determined to be executing similar work. As before, this second, sample node subset may be the only subset sampled at a given instant and at the determined sample rate.

The system 100 may continue to sample at block 410 each node of the plurality of nodes in round-robin fashion. Where desired, the analysis of the performance data of the sample nodes may be output at block 412. In some embodiments, the analysis may be continuously accomplished as the process cycles back at block 404 of FIG. 4.

Figure 5:
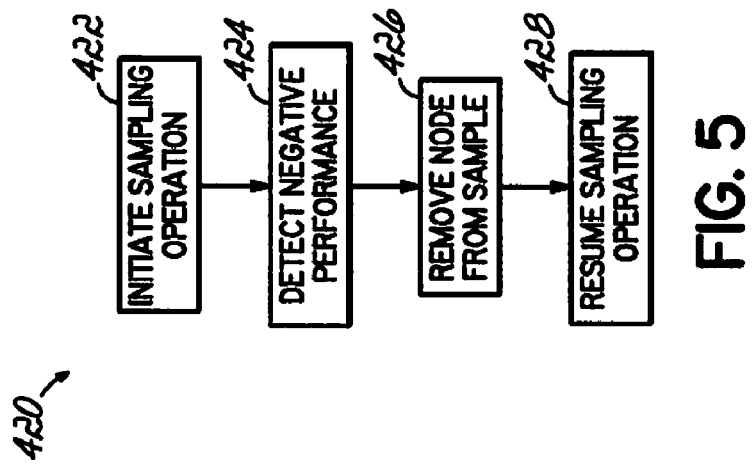
FIG. 5 is a flowchart having steps suitable for execution by the system of FIG. 1 for correcting for undesirable performance that is attributable to a sampling operation.

FIG. 5 is a flowchart 420 having steps suitable for execution by the system 100 of FIG. 1 to correct for undesirable performance. Such unsatisfactory performance may be attributable to a sampling operation. More particularly, the embodiment shown in FIG. 5 may be used where it is determined that one or a relatively small number of the plurality if nodes have been significantly and detrimentally affected by a sampling operation.

Turning more particularly to FIG. 5, a sampling operation may be initiated or ongoing at block 422. The system 100 may detect at block 424 a negative performance characteristic. Examples of negative performance may include cache misses and timing delays, among others detectable using existing performance monitoring programs.

In response to detecting the negative performance at block 424, the system 100 may remove at block 426 the node(s) from the sampling procedure. Sampling may then be resumed at block 428.

It will be appreciated that various modifications may be made to the illustrated embodiments without departing from the spirit and scope of the invention. One skilled in the art will appreciate that embodiments consistent with the invention also apply to other forms of performance tools, such as collection of statistics using object creation rates, database query monitoring, object locking and weight state statistics. It will also be appreciated that the implementation of a code generation tool and an analysis tool to implement the herein described functionality would be well within the abilities of one of ordinary skill in the art having the benefit of the instant disclosure.

Other modifications will be apparent to one of ordinary skill in the art. Therefore, the invention lies in the claims hereinafter appended.

What is claimed is:

1. A method of sampling performance data of a plurality of interconnected nodes comprising a massively parallel computer system, the method comprising:

identifying a plurality of nodes doing similar work;

distributing an overhead for performance sampling across the plurality of nodes by sampling at different times performance data associated with first and second subsets of the plurality of nodes, wherein distributing the overhead for performance sampling across the plurality of nodes includes sequentially sampling the plurality of nodes in a round-robin fashion; and analyzing the performance data.

2. The method of claim 1, wherein sampling the performance data of the first subset further comprises sampling the performance data of a first node of the plurality of nodes.

3. The method of claim 1, wherein identifying the plurality of nodes doing the similar work further comprises identifying a plurality of nodes executing a common application.

4. The method of claim 1 further comprising adjusting a sampling rate at which the performance data is sampled.

5. The method of claim 1, wherein identifying the plurality of nodes doing the similar work further comprises automatically identifying the plurality of nodes doing the similar work.

6. The method of claim 1, wherein sampling the performance data further comprises sampling the first and second subsets at a common sampling rate.

7. The method of claim 1 further comprising determining that the first subset is performing unsatisfactorily.

8. The method of claim 7 further comprising removing the first subset from a subsequent sampling operation in response to determining that the first subset is performing unsatisfactorily.

9. An apparatus, comprising:

a hardware processor; and program code configured to be executed by the processor to sample performance data of a plurality of interconnected nodes comprising a massively parallel computer system, the program code configured to identify a plurality of nodes doing similar work, to distribute an overhead for performance sampling across the plurality of nodes by sampling at different times performance data associated with first and second subsets of the plurality of nodes, and to analyze the performance data, wherein the program code distributes the overhead for performance sampling across the plurality of nodes by sequentially sampling the plurality of nodes in a round-robin fashion.

10. The method of claim 9, wherein the first subset includes a single node of the plurality of nodes.

11. The method of claim 9, wherein the first subset includes multiple nodes of the plurality of nodes.

12. The method of claim 9, wherein the first and second subsets are working in parallel on an application.

13. The method of claim 9, wherein the program code identifies the first and second subsets automatically.

14. The method of claim 9, wherein the first and second subsets are both sampled at a sampling rate.

15. The method of claim 9, wherein a sampling rate at which the first subset is sampled is adjustable.

16. The method of claim 9, wherein the program code determines that the first subset is performing unsatisfactorily.

17. The method of claim 16, wherein the program code removes the first subset from a subsequent sampling operation in response to determining that the first subset is performing unsatisfactorily.

18. A program product, comprising:

program code configured to sample performance data of a plurality of interconnected nodes comprising a massively parallel computer system, the program code configured to identify a plurality of nodes doing similar work, to distribute an overhead for performance sampling across the plurality of nodes by sampling at different times performance data associated with first and second subsets of the plurality of nodes, and to analyze the performance data, wherein the program code distributes the overhead for performance sampling across the plurality of nodes by sequentially sampling the plurality of nodes in a round-robin fashion; and a recordable type computer readable medium bearing the program code.

* * * * *